United States Patent [19]

Yano

[11] Patent Number: 4,555,282

[45] Date of Patent: Nov. 26, 1985

[54] METHOD OF AND MEANS FOR BONDING SYNTHETIC RESIN PROFILED FASTENERS TO FILM SUBSTRATE

[75] Inventor: Mitsuru Yano, Shizuoka, Japan

[73] Assignee: Seisan Nippon Sha, Ltd., Tokyo, Japan

[21] Appl. No.: 566,196

[22] Filed: Dec. 28, 1983

Related U.S. Application Data

[63] Continuation-in-part of Ser. No. 380,832, May 21, 1982, abandoned.

[30] Foreign Application Priority Data

May 28, 1981 [JP] Japan ............................... 56-080190

[51] Int. Cl.[4] ............................................... B29D 5/00

[52] U.S. Cl. ................................. 156/66; 156/244.23; 156/244.25; 156/498; 264/177 R; 264/348; 383/97

[58] Field of Search ................ 156/66, 244.11, 244.25, 156/244.23, 498; 229/62, 68 R; 383/97; 264/177 R, 348

[56] References Cited

U.S. PATENT DOCUMENTS

Re. 28,969 9/1976 Naito .................................... 383/97
3,945,872 3/1976 Noguchi ......................... 156/498 X
4,259,133 3/1981 Yagi ................................ 156/498 X
4,372,793 2/1983 Herz ..................................... 156/66

*Primary Examiner*—Robert A. Dawson
*Attorney, Agent, or Firm*—Hill, Van Santen, Steadman & Simpson

[57] ABSTRACT

A method of and apparatus for fusion bonding a continuous synthetic thermoplastic resin fastener strip having a fastener profile portion and a base portion opposite the profile, to a continuous film substrate. The substrate is advanced continuously through a bonding zone. Continuous direct transit of the fastener strip is effected from thermoplastic extruder downwardly through a short distance to the bonding zone, so that in the short transit distance the fastener strip will retain substantial residual thermoplastic fusion temperature. The fastener profile portion is chilled while the strip is in transit to the bonding zone, solidified and stabilized, but the base portion is left at sufficient residual fusion temperature to remain thermoplastic to the bonding zone where assembly of the strip and substrate is effected by fusion bonding of the base portion to the substrate. An annular rotary heating surface may be applied to a narrow locally limited longitudinal area of the substrate for supplying to such area fusion promoting heat in the bonding zone, such area being aligned with the fastener strip in the assembly. The longitudinal area may be stretched by the rotary heating surface.

32 Claims, 7 Drawing Figures

METHOD OF AND MEANS FOR BONDING SYNTHETIC RESIN PROFILED FASTENERS TO FILM SUBSTRATE

The present application is a continuation-in-part of my patent application Ser. No. 380,832 filed May 21, 1982, now abandoned.

This invention relates to improvements in joining synthetic separable fasteners to prefabricated film substrate in a continuously running manner to produce an integral material especially useful for making reclosable bags. More particularly, an important concept of the present invention resides in producing separable fastener equipped film from biaxially oriented plastic material such as polypropylene for use in making such products as reclosable bags.

Polypropylene, for example, is well suited for withstanding boiling temperatures without deterioration of the film or the separable fasteners, and the polypropylene has superior resistance to tearing, as compared to polyethylene which is the material from which bag making separable fastener carrying film is usually made. However, the biaxially oriented plastic film is desirably prefabricated separately from the fastener profiles. When attempts were heretofore made to apply freshly extruded plastic fastener strips to the desirably very thin biaxially oriented, or other very thin plastic films serious heat shrinkage and wrinkling were encountered. Another problem was encountered in that the polypropylene resin requires high heat to attain the necessary relatively low melt viscosity plasticity for extrusion, and as extruded the material retains the fusion temperature for a substantial distance downstream from the extrusion die, so that fastener profiles extruded from the polypropylene resin tend to collapse gravitationally. If the entire extrusion is of sufficient plasticity when applied to the joined substrate, it will permanently and unacceptably distort from the application of the necessary bonding pressure, even though slight, that must be applied to effect bonding of the fastener strip to the film substrate.

After much experimentation, the present applicant discovered that by effecting continuous, direct, free running transit of the fastener strip downwardly from the thermal plastic extruder through a short distance to the bonding zone located below the extruder, and in that free running short transit distance and before the fastener strip reaches the bonding zone, selectively chilling and thereby solidifying and stabilizing the fastener profile portion of the transitting fastener strip, but leaving the base portion at sufficient residual fusion temperature to remain thermally plastic to the bonding with the prefabricated film substrate, any undesirable tendency toward flowing, teardropping or gravity impelled distortions of the profiles of the fastener strip were avoided. Thereby the base portions of the fastener strips remain effectively thermoplastic to the point of bonding with the substrate, but the solidified profiles resist the necessary pressure to effect thorough bonding. This technique had to be developed by the present applicant because no help could be gained from the prior practice or from prior patents or literature available to the present applicant for meeting the problem.

In the prior Takahashi U.S. Pat. No. 4,279,677, assigned to the same assignee as the present application, a desirable method of and apparatus for joining plastic fastener strip continuously to a prefabricated film in flat sheet form has been disclosed. The present invention improves upon the method of that patent and provides a simplified and more economical apparatus, and more particularly adapted for successful extruding and applying of separable fastener strip formed from a plastic having the characteristics of polypropylene.

Both the invention of the prior patent and the present invention are directed to providing material for making reclosable bags comprising single layer or multi-layer sheet film, generally formed from a suitable plastic, and which in the present case may preferably comprise a biaxially oriented polypropylene film, but without limitation as to the particular film material suitable for the intended purpose. Therefore, the term "film" is generally used herein in a generic, non-limiting sense.

The desired bag material comprises an integral assembly of profiled synthetic resin, i.e., plastic separable fastener means on a film substrate, the fastener means desirably comprising a female profile strip and a male profile strip which are carried by the film in a manner adapting the profiles to be coupled for closing a bag made from the material and adapted to be separated by forcing the profiles apart as by being pulled apart to open the bags. Although integrally coextruded film and profiles have been widely used, the extrusion speed is limited by the extrusion requirements for the profiles which are of much greater unit mass than the film, and there are problems encountered in the differential in cooling rates of the profiled fasteners and the film, especially where the film is very thin.

Preformed fastener strips have been attached to preformed film, both derived from a rolled stock supply by fusion welding in a step and advance method, but this requires handling and storage of the fastener strip and is a rather slow expedient.

Ideally, the fastener strip should be joined with the film immediately upon extrusion, and utilizing the residual fusion temperature in the extruded strip for fusion bonding of the profile strip to the film, as taught, for example, by the aforesaid U.S. Pat. No. 4,279,677. According to that patent, chilling and solidifying of the fastener is effected after the fusion bonding. However, the entire fastener profile strip retains residual fusion temperature throughout and thus is in a soft and easily deformable state up to the time of chilling and solidification. Therefore, during the transfer and bonding of the fastener strips to the film, there is an undesirable liability for deformation of the profiles, and thus loss of proper function in service. On the other hand, the male and female interlockable profiles must retain a fairly precise formation in order to function satisfactorily.

Where the freshly extruded fastener strips are directly applied to very thin film, as heretofore practiced, the surface of the film may be excessively fused by the residual fusion temperature of the profile strips, resulting in thermal deterioration in the film, and the excessive bonding heat thus generated, may spread to portions other than the bonding area of the film, causing elongation and upon cooling, shrinkage developing wrinkles and thus reducing the commercial value of the product, unless elaborate precautions are taken.

According to the aforesaid U.S. Pat. No. 4,279,677, the fastener strip is obviously extruded from polyethylene which has a good form-retaining viscosity as extruded so that the fastener profiles of the extruded strip will maintain satisfactory shape to the joinder with the prefabricated film even though the fastener strip is pulled upwardly toward the bonding zone, and then the fastener strip is chilled after it has been joined with the substrate. Such upward pulling of the fastener strip and the necessary pressure exerted by the fastener strip against the substrate at the point of joinder will not be tolerated by a fastener strip extruded from a material such as polypropylene, where the fusion state of the freshly extruded plastic fastener strip tends toward instability of the extruded shape.

Attention is also directed to Noguchi U.S. Pat. No. 3,945,872, wherein the profile strip is extruded vertically upwardly and is pulled upwardly to joinder with the prefabricated film. Then, well above the point where the joinder takes place, the fastener profile is chilled. Here, again, the plastic of the profile is obviously polyethylene, which has a linear molecular orientation in the extruded material of the profile strip. There is no hint in this patent of how to overcome the problem of extruding and applying a profile at a much lower extrusion viscosity, and in particular extruding the profile from a plastic material having the extrusion characteristics of polypropylene and where the profile portion of the fastener strip has a tendency to collapse when drawn upwardly from the extruder, the force of gravity tending to cause the profile to lose shape and go into what may be termed a teardrop or raindrop like state, and then tends to become badly deformed when bonding pressure is applied at the bonding zone. It may be noted, therefore, that the teaching of this patent is directly away from the concepts of the present invention.

In Nato U.S. Pat. No. Re. 28,969, the only teaching to be derived is that the separable fasteners and the film can be extruded together, and polyethylene is the material specified and which lends itself to the technique taught by this patent, whereas plastic material having the characteristics of polypropylene does not lend itself to this mode of producing separable fastener carrying film.

Herz U.S. Pat. No. 4,372,793 deals with a completely different manner of joining fastener strip to plastic film. The disclosure of this patent is entirely devoted to joining prefabricated film and prefabricated cold fastener strip together by means of adhesive applied to the wholly previously prefabricated and finished elements of the assembly.

It is, accordingly, an important object of the present invention to overcome the disadvantages, drawbacks, inefficiencies, shortcomings and problems inherent in prior practice and to provide a new and improved method of and means for bonding synthetic resin profiled fasteners to film substrate.

Another object of the invention is to provide a new and improved bonding of freshly extruded plastic (e.g. polypropylene) fastener strip to a continuously running substrate film (e.g. biaxially oriented polyproylene resin or other film) in a manner to effect bonding by the retained heat in the base portion of the fastener strip while maintaining the integrity of the profile structure of the fastener strip and effecting the bonding with substantial freedom from heat shrinkage of the substrate film by virtue of the substantial reduction in the overall temperature of the fastener strip in which fusion temperature is maintained only in the base portion to the point of attachment to the film in the bonding zone.

A further object of the invention is to provide a new and improved method of and means for bonding synthetic resin profiled fasteners to film substrate and wherein the profiled fasteners are extruded downwardly from a plastic material in a fusion state wherein the fastener profiles will normally not maintain the desired form to the point of joinder with the substrate but by practice of the present invention does maintain the profile shape accurately while maintaining sufficient fusion temperature in the fastener strip bases to effect fusion bonding to the substrate.

To this end, the present invention provides a method of fusion bonding a continuous freshly extruded low melt viscosity synthetic thermoplastic resin fastener strip having a fastener profile portion and a base portion opposite the profile, to a continuously running prefabricated film substrate, which comprises advancing the prefabricated substrate continuously through a bonding zone in which the substrate is directed to run downwardly; effecting continuous direct free running transit of the fastener strip downwardly from thermoplastic extruder means through a short transit distance to said bonding zone located below said extruder means, so that in such short transit distance said fastener strip as a whole would tend to retain substantial residual thermoplastic fusion temperature; in said free running short transit distance, and before the fastener strip reaches said bonding zone, selectively chilling and thereby solidifying and stabilizing said fastener profile portion of the transitting fastener strip, and thereby preventing deformation of said profile but leaving said base portion at sufficient residual fusion temperature to remain thermoplastic to said bonding zone; at the downstream end of said short transit distance effecting assembling of the still thermoplastic base portion of the otherwise solidified strip with said substrate in said bonding zone, and in said bonding zone pressing the assembled downwardly running strip and substrate together and thereby effecting fusion bonding of said thermoplastic base portion to said substrate; and downstream from said bonding zone setting and curing the bonded assembly.

This invention also provides apparatus for fusion bonding a continuous freshly extruded low melt viscosity synthetic thermoplastic resin fastener strip having a fastener profile portion and a base portion opposite the profile, to a continuously running prefabricated film substrate, which comprises means for advancing the prefabricated substrate continuously through a bonding zone in which the substrate is directed to run downwardly; means for thermoplastically extruding the fastener strip for continuous free running direct transit through a short distance downwardly to said bonding zone, so that in such short transit distance, said fastener as a whole would tend to retain substantial residual thermoplastic fusion temperature; means located in said free running short transit distance, and before the fastener strip reaches said bonding zone, for selectively chilling and thereby solidifying and stabilizing said fastener profile portion of the transitting fastener strip, for preventing deformation of said profile, but leaving said base portion of the transitting fastener strip at sufficient residual fusion temperature to remain thermoplastic to said bonding zone; means located at the downstream end of said short transit distance for effecting assembly of the still plastic base portion of the otherwise solidified strip with said substrate in said bonding zone, and for in said bonding zone pressing the assembled downwardly running strip and substrate together and thereby effecting fusion bonding of said thermoplastic base portion to said substrate; and means downstream from said bonding zone for setting and curing the bonded assembly.

Under some circumstances, the heat volume for effective bonding of fastener strip to film substrate may be insufficient, such, for example, where the substrate is a thick film, as distinguished from a very thin film or a biaxially oriented polypropylene film having a high heat shrinkability. To meet this situation, the present invention provides for selectively locally heating the longitudinal area to which the profile strip is to be laminated.

Accordingly, there is provided pursuant to the present invention a method of fusion bonding a fastener strip having a fastener profile and a base portion opposite the profile, to a continuous sheet of film substrate, which comprises advancing the substrate continuously through a bonding zone, applying an annular rotary heating surface to a narrowly locally limited longitudinal area of said substrate and thereby supplying said longitudinal area with fusion promoting heat in said bonding zone, aligning said fastener strip in assembly with the thus heated longitudinal substrate area in said bonding zone and engaging and bonding said base portion to said heated longitudinal substrate area, and setting and curing the bonded assembly.

There is also provided apparatus for fusion bonding a fastener strip having a fastener profile and a base portion opposite to the profile, to a continuous sheet of film substrate, which comprises: means for advancing the substrate continuously through a bonding zone; rotary bonding roll means having an annular heating surface for application to a narrow locally limited longitudinal area of said substrate for thereby supplying said longitudinal area with fusion promoting heat in said bonding zone; means for aligning said strip in assembly with the heated longitudinal substrate area in said bonding zone and for engaging and bonding said base portion to said heated longitudinal substrate area; and means for chilling the bonded assembly.

Other objects, features and advantages of the invention will be readily apparent from the following description of representative embodiments thereof, taken in conjunction with the accompanying drawings, although variations and modifications may be effected without departing from the spirit and scope of the novel concepts embodied in the disclosure, and in which.

Figure 1:
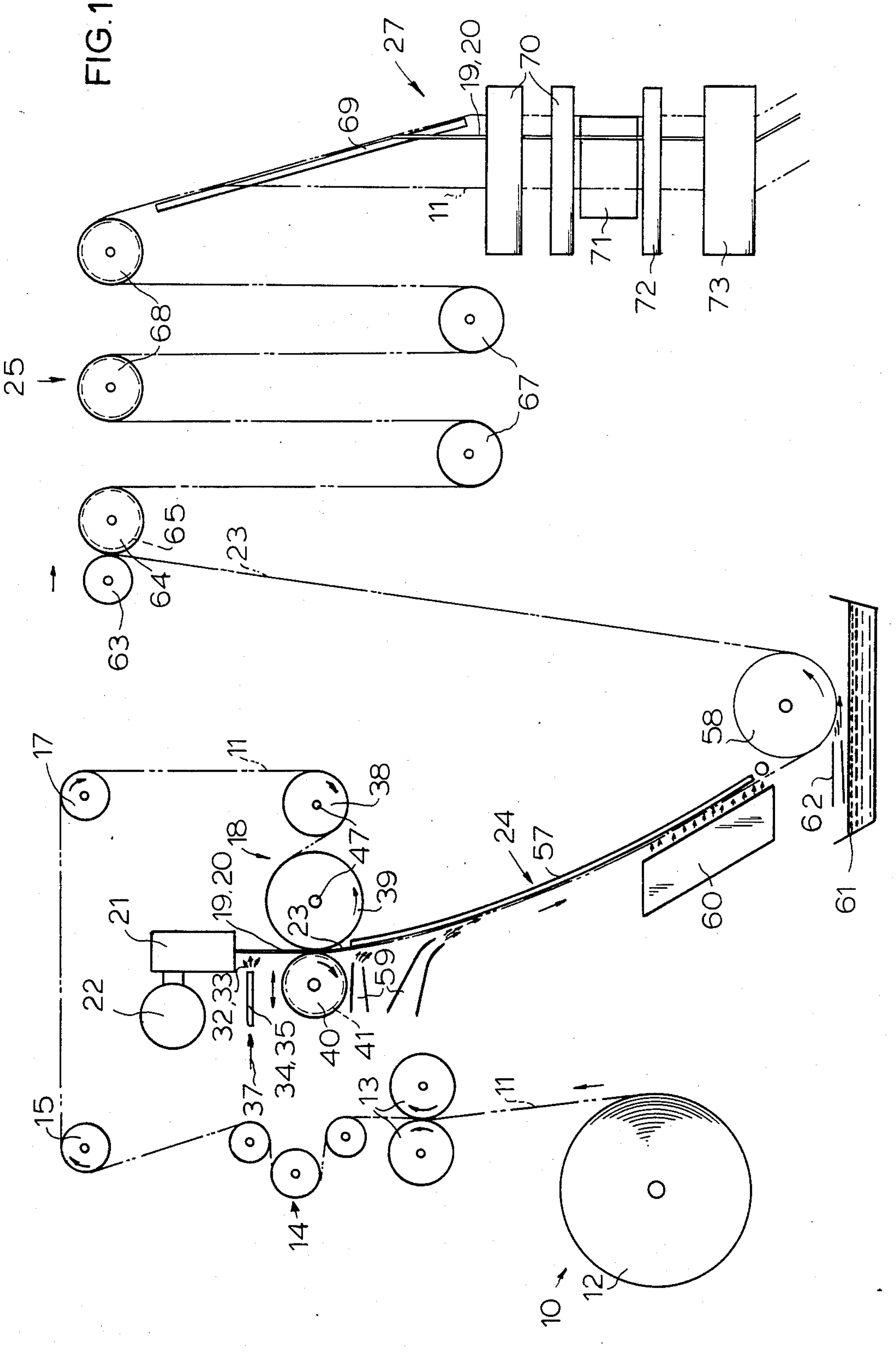
FIG. 1 is a schematic illustration of a system including means for practicing the present invention.
Figure 2:
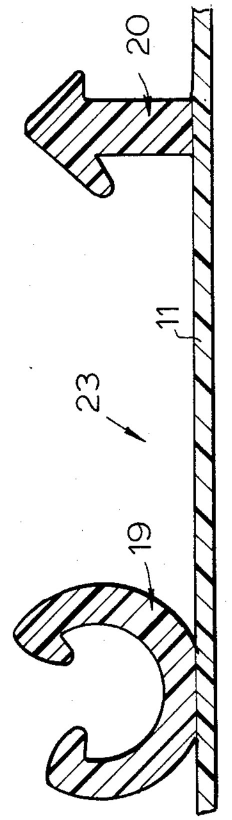
FIG. 2 is a fragmentary sectional detail view through a film and fastener profile assembly.
Figure 3:
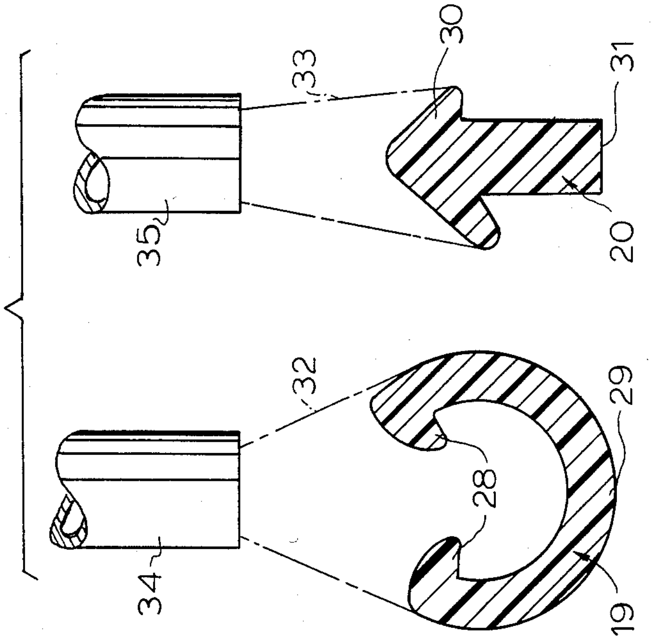
FIG. 3 is a schematic illustration showing how chilling airstreams are applied to the profile portions of the fastener strips.

Referring to FIG. 1, apparatus of the present invention with which the method of the present invention is adapted to be practiced, comprises a preformed film supply station 10, in which prefabricated film 11 drawn from a supply roll 12 by cooperatively rotatably driven web or film feeder pinch rolls 13 passes on through reverse bending rollers 14 which straighten out any longitudinal curvature bias that may have developed during storage in the supply roll 12. From the straightening rolls 14, the film 11 passes over idler guide rolls 15 and 17 to a bonding station or zone 18 where the film is joined in assembly with one or more and preferably at least a pair of cooperatively separably interlockable synthetic resin, i.e., plastic, fastener strips 19 and 20 (FIGS. 1–4) extruded through a nozzle structure 21 of an extruder 22. Beyond the bonding zone 18, the film and fasteners comprise an integral assembly 23 which passes on through a conditioning station or zone 24 and then through a final curing interval station or zone 25. Thereafter, the film/fastener assembly 23 may be rolled up for storage and/or further processing as a preformed assembly, or as shown, may move directly to a folding and fastener closing station or zone to provide bottom filling bag material which may then be rolled up into storage or bag machine supply rolls or may be directed continuously to a bag filling and forming machine.

As extruded from the extruder die 21, the fastener strip 19 has a fastener profile portion 28 and a base portion 29. On the other hand, the fastener strip 20 has a fastener profile portion 30 and a base portion 31. In this instance, the profile portion 28 of the fastener strip 19 is shown as of dual hook female profile shape and the profile portion 30 of the fastener strip 20 is shown of dual shoulder rib male profile shape complementary to the profile portion 28 so that the profiles can be separably interlocked as is customary. Location of the fastener profile strips 19 and 20 on the film 11 is in such spaced parallel relation that when the film is folded midway between the fastener strips, they will be in interlockable alignment.

Figure 4:
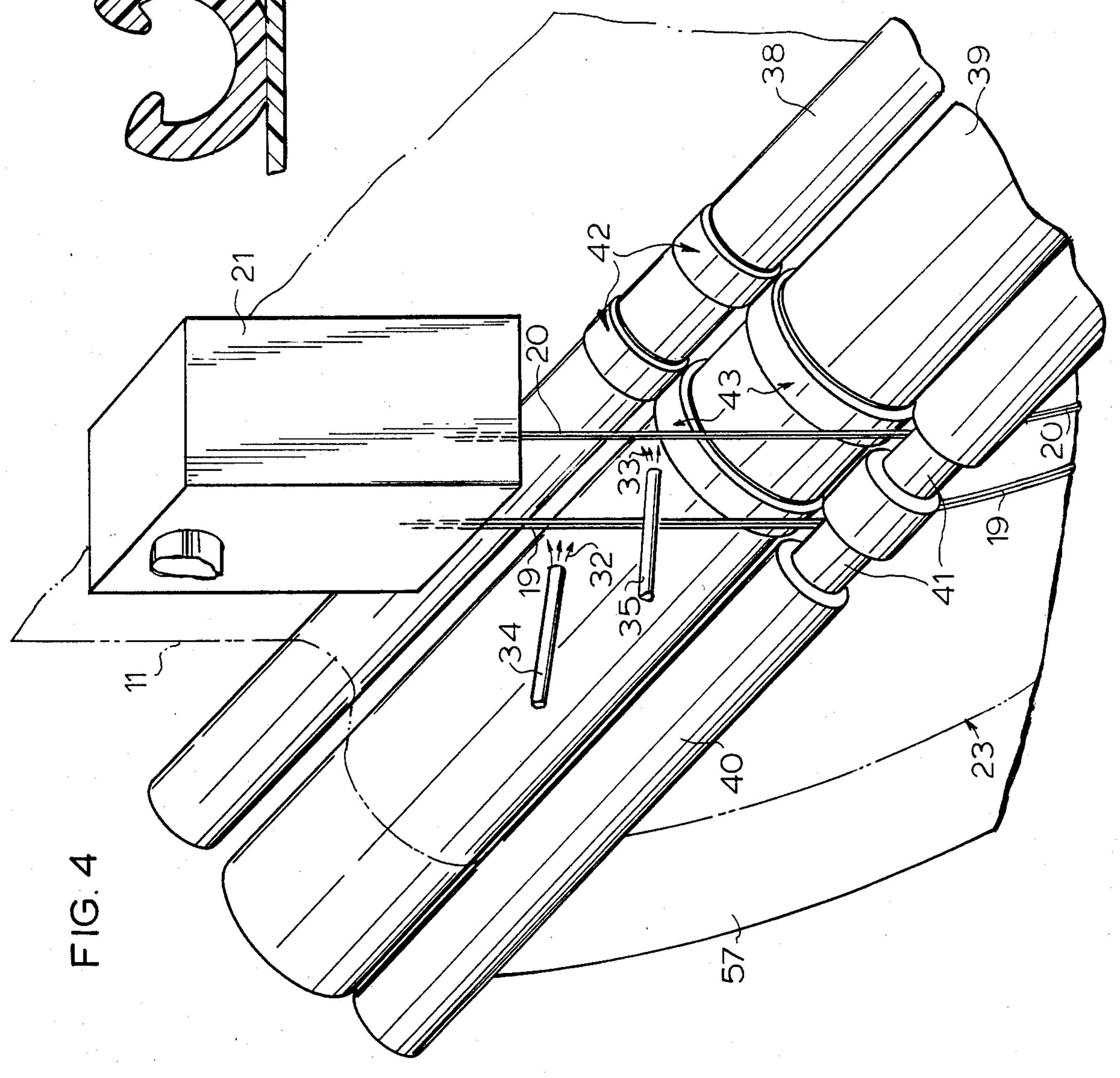
FIG. 4 is a fragmentary enlarged elevational view of the apparatus of FIG. 1 in, and in the vicinity of, the bonding zone of the apparatus.

To facilitate bonding of the fastener strips 19 and 20 to the substrate provided by the web 11, the film substrate 11 is advanced through the bonding zone 18 continuously at a speed coordinated with the speed of extrusion molding of the fastener strips 19 and 20 for joining of the fastener strips with the film in corunning relation. In a simple, efficient, economical, energy efficient manner, free transit of the freshly extruded fastener strips 19 and 20 is effected continuously and directly from the extruder through a short distance downwardly as shown in FIGS. 1 and 4 to the bonding zone 18, and more particularly to joinder with the film substrate 11 in the bonding zone located below the extruder 21. This short direct transit distance should be such that the fastener strips will retain substantial residual thermoplastic fusion temperature so that fusion bonding to the film substrate can be effected without reheating either fastener strip. Downward extrusion has been found to be especially advantageous where a plastic material of low melt viscosity such as polypropylene is used for forming the fastener profiles. As extruded, the polypropylene plastic is of substantially lower viscosity than, for example, polyethylene which has straight chain high molecular weight molecular structure and because of its much higher extruded viscosity, can be drawn upwardly from the extrusion die to a bonding zone joinder with a substrate. The profiles of fastener strips extruded from polypropylene plastic have a strong tendency to collapse or at least undesirably distort while transitting from the extruder to the bonding zone, and it is not feasible to follow the usual upward extrusion and/or pulling toward the bonding zone as practiced with polyethylene. The polypropylene fastener profiles also tend when left untreated while in transit from the extruder to the bonding zone, to distort when pressure is applied in the bonding zone at joinder of the fastener strips with the substrate.

In order to maintain integrity of the profile portions 28 and 30 of the fastener strips 19 and 20, the profile portions are chilled and solidified and stabilized during the short downward transit distance from extruder to bonding, but the base portions 29 and 31 are left at sufficient residual fusion temperature to remain thermoplastic to the bonding zone and more particularly to joinder with the film substrate. To this end, the fastener profile portions 28 and 30 are subjected during the short transit from extruder to bonding zone, to respective low velocity chilling air streams 32 and 33, (FIGS. 1, 3 and 4), respectively, and controlled to be of just the correct volume and temperature, having regard to the speed of travel of the profile strips to chill and set the profiles while leaving sufficient residual fusion temperature in the profile base portions 29 and 31, respectively, to remain thermoplastic to the bonding zone. Means for directing the profile-chilling air streams 32 and 33 comprise respectively air nozzles 34 and 35 which receive the chilling air from any preferred suitable source and under suitable control, indicated schematically in FIG. 1 by the arrow 37.

Means are provided in the bonding zone 18 for effecting assembly of the film substrate 11 and the fastener strips 19 and 20, and effecting fusion bonding of the base portions 29 and 31 to the substrate. For this purpose, the substrate 11 is lead from the idler roller 17 about a rotary guide roller 38 located parallel and adjacent to a rotatably driven bonding roll 39 over which the substrate 11 runs toward assembly of the substrate with the fastener strips 19 and 20. A pinch roll 40 cooperates in corunning relation with the bonding roll 39 in a downwardly running nipping relation for not only pressing the film substrate 11 against the roll 39 for positive substrate advance, but also for guiding and pressing the fastener strips 19 and 20 into bonding relation to the film substrate, and more particularly pressing the fastener strips toward the film substrate on the roll 39 so that fusion bonding of the thermoplastic base portions 29 and 31 is effected to the substrate. To accommodate the fastener strips 19 and 20, the pinch roll 40 is provided with respective axially spaced peripheral grooves 41 (FIG. 4).

While fusion bonding of the fastener strips to a very thin film substrate may be effective by virtue of the thermoplastic nature of the base portions 29 and 31 resulting from residual extrusion fusion temperature, for thicker film substrates auxiliary heating may be required. To this end, the bonding zone 18 is desirably equipped with auxiliary heating means for the film substrate, in this instance, simply and efficiently comprising respective selective annular heating surfaces 42 and 43 on respectively the guide roller 38 and the bonding roll 39. These annular rotary bonding roll means heating surfaces 42 and 43 are aligned with one another and with narrowly locally limited longitudinal areas of the substrate aligned with and desirably about the same width as the base portions 29 and 31 of the fastener strips. Thereby, fusion promoting heat is applied economically and efficiently to the longitudinal bonding areas of the substrate auxiliary to the thermoplastic fastener bases and without heat distortion of the remainder of the film substrate.

Figure 6:
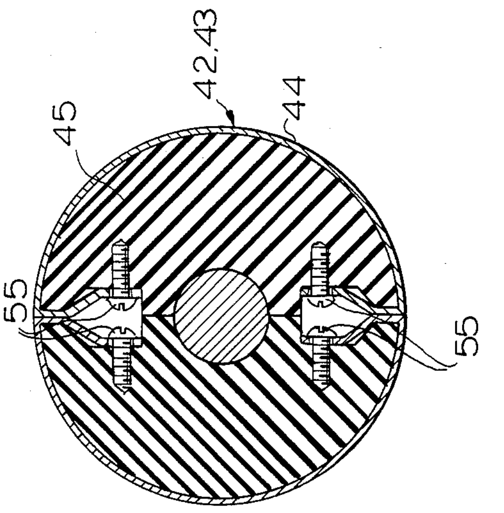
FIG. 6 is a vertical sectional detail view taken substantially along the lines VI—VI of FIG. 5.
Figure 7:
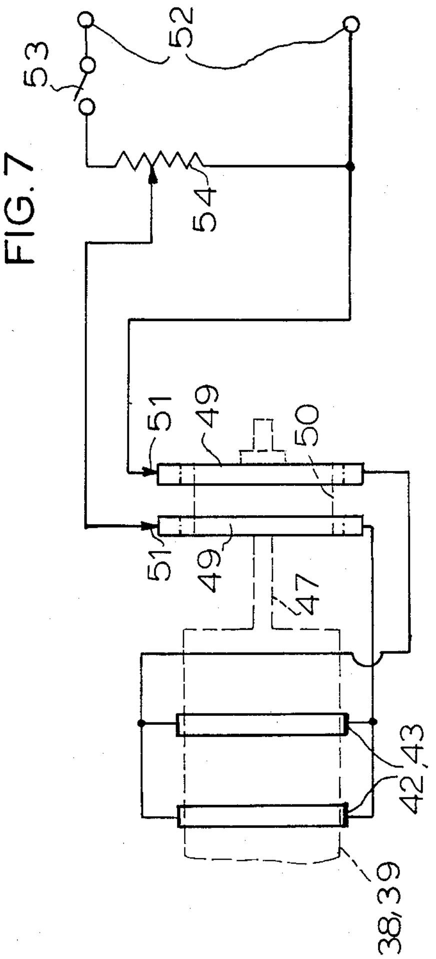
FIG. 7 is a simple electrical diagram involved with certain functions in the bonding zone of the apparatus.
Figure 5:
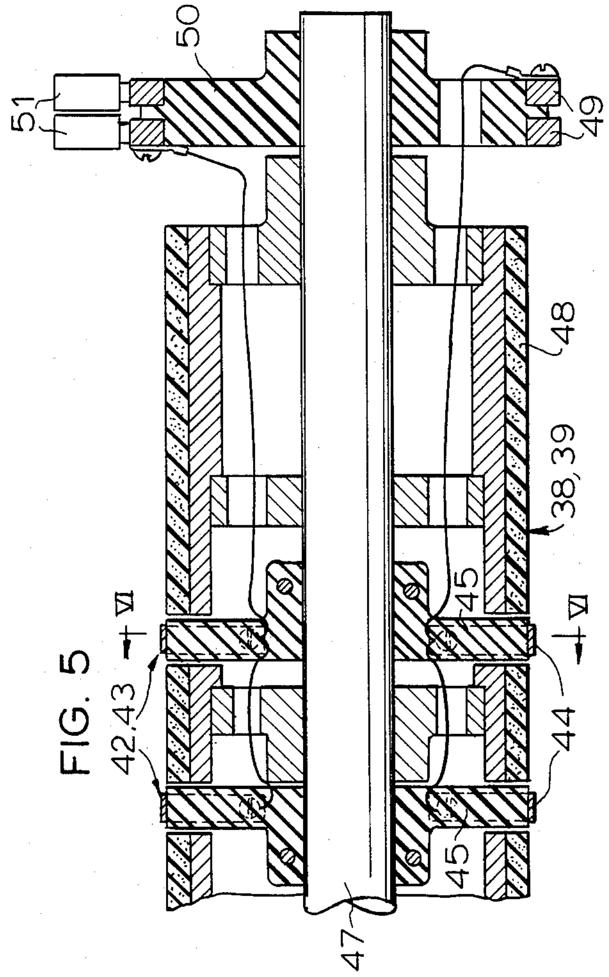
FIG. 5 is an enlarged fragmentary longitudinal sectional view typifying structure of certain of the rotary rolls in the bonding zone of the apparatus.

In FIGS. 5–7 is exemplified a desirable structural and electrical heating arrangement for the selective heat applying annular surfaces 42 and 43. Each of the heating surfaces 42 and 43 desirably comprises an electrical resistance ribbon 44 (FIGS. 5 and 6) mounted on the perimeter of a respective heat resistant and preferably dielectric disk 45 fixed corotatively with the associated roller or roll 38, 39 on a common rotary shaft 47. The roller 38 and the roll 39 are desirably each constructed of coaxially aligned sections substantially as shown to accommodate the heater disks 45. For film substrate traction purpose, at least the roll 39, but if preferred, also the roller 38, may carry a traction sleeve 48 of suitable friction material. To compensate for any expansion of the narrowly limited longitudinal heated areas of the film substrate engaged by the auxiliary heating surfaces 42 and 43, such surfaces are desirably of a slightly larger differential diameter than the remainder of the perimeters of the respective roller 38 and roll 39. This assures a uniform, smooth, stable condition of the heated fastener strip receiving longitudinal areas of the substrate by a slight tensioning relative to the remainder of the film substrate running on the normal diameter sections of the associated roller or roll. It may also be noted that the grooves 41 in the pinch roll 40 are of ample depth to accommodate the differentially larger diameter annular heating surfaces 43.

Electrical energy is supplied to the electrical resistance ribbons 44 by means comprising an electrical circuit comprising for each of the roller 38 and the roll 39 slip rings 49 carried by a dielectric mounting disk 50 secured fixedly in corotative relative on the shaft 47. Suitably mounted brushes 51 are connected to a power source 52 under the control of a switch 53, and the current passing through a potentiometer 54 for adjustability of the current for attaining optimum temperature in the annular heating surfaces 42, 43. Connection of the electrical resistance ribbons with the slip rings 49 is by way of terminals 55 carried by the mounting disks 45. The switch 53 permits the electrical heating means to be employed optionally when the thickness of the film substrate warrants.

As the fastener and substrate assembly 23 (FIGS. 1 and 4) leaves the bonding zone 18, and enters the conditioning zone 24, the assembly is acted upon by cooling means comprising a cooling or heat sink plate 57 extending downwardly a substantial distance along the path of the assembly 23 which may have a curved face in lengthwise direction and extending between the bonding zone and a direction changing rotatable roll 58. Additional cooling means comprise a preferably series of chilling air jets 59 directing chilling air against the separable fasteners on the assembly 23 in close proximity downstream from the bonding roll 39. In addition, or optionally, a cooling water spray may be applied toward the plate 57 against the assembly 23 from water spray means 60. Spent cooling water may be received in a drain receptacle 61 below the turnaround roller 58. Assistance in cooling the substrate and in purging spent water from the assembly 23 may be provided by air jet means 62 directed tangentially toward the lower part of the roller 58 about which the assembly 23 runs before travelling onto the final curing zone 25.

At the entry end of the final curing zone 25, the film and fastener assembly 23 travels through the nip of cooperating feed rolls 63 and 64, and of which the feed roll 64 desirably has groove means 65 for accommodating the fasteners on the assembly 23. Thence, the assembly 23 runs successively about and over a plurality of lower plain rollers 67 and upper grooved rollers 68. After the assembly 23 has been thoroughly dried, cooled and cured in the curing zone 25, the assembly passes on to the folding and fastener closing zone 27. Therein the assembly 23 is folded about a folding device 69 whereby the film 11 of the assembly is folded upon itself and the profiles of the fastener strips 19, 20 are brought into registration with one another. The folded assembly is then guided by, successively, rolls 70 and a slider plate 71 to a pinch roll assembly 72 wherein the fasteners are pressed interlockingly together. Guide roller means 73 may be provided for assisting in guiding the thus treated assembly to a desired disposal point.

From the foregoing it will be apparent that the present application teaches an entirely new technique involving the downward extrusion of the fastener strips so that the strips move in the direction in which raindrop-like deformation of the profiles may tend to occur by reason of gravity, and then the profiles are set by cooling with a mild, i.e. low, velocity coolant applied selectively to the profile portions of the strips immediately after extrusion and upstream from the bonding zone, so that not only is the integrity of the profile portions of the strips maintained in downward transit to the bonding zone, but at the bonding zone the profile portions withstand the bonding pressure which assures thorough bonding of the base portions of the strips which have remained to that point in a residual extrusion temperature fused state for efficient bonding to the substrate.

By virtue of the joining of the fastener strips to the surface of the film, with both the fastener strips and the film running downwardly, bonding pressure can be reduced, and thus the likelihood of the fastener profiles being deformed in the bonding zone is advantageously minimized. This departs significantly from the technique employed in the prior art in which the fastener strip is drawn upwardly to the bonding zone, and because of the upward pulling of the strip necessarily entailing substantial pressure against the profiles in the bonding zone.

By reducing the overall quantum of residual extrusion heat in the fastener strips selective cooling and firming of the fastener strip profiles upstream from the bonding zone and retaining only sufficient extrusion heat limited to the base areas of the strips so as to maintain the base areas in a fused state for effective bonding to the substrate, excessive heating of a substrate film such as polypropylene, which is subject to shrinkage on becoming excessively heated, is avoided, since the area of fastener strip contact with the substrate film is not subjected to the larger quantum of residual heat which would otherwise be retained in the much greater unit mass of the fastener strip if it is not selectively chilled except for the base area which must remain in the fused state for efficient bonding.

Where for some requirements heavier gauge biaxially oriented film substrate must be used, there may not be sufficient residual fusion heat remaining in the base areas of the fastener strip to effect adequate bonding to the substrate in the bonding zone and for this reason there has been provided according to the concepts of the invention in the present application the feature of selectively preheating the limited area of the substrate film where the fastener strip is to be secured. This is especially advantageous with biaxially oriented plastic film because heat shrinkage of the film is minimized while attaining the desired bonding of the fastener strips with prechilled and firm profiles to the substrate film.

The method and apparatus as described and claimed in the present application enables the successful production of separable fastener carrying film assemblies where the film is made from biaxially oriented resin film and the fastener is made from high melt point low viscosity material thereby attaining during the manufacturing process, and in the end product, the advantages accruing from the use of the biaxially oriented resin film material.

It will be understood that variations and modifications may be effected without departing from the spirit and scope of the novel concepts of this invention.

I claim as my invention:

1. A method of fusion bonding a continuous freshly extruded low melt viscosity synthetic thermoplastic resin fastener strip having a fastener profile portion and a base portion opposite the profile, to a continuously running prefabricated film substrate, which comprises:

advancing the prefabricated substrate continuously through a bonding zone in which the substrate is directed to run downwardly;

effecting continuous direct free running transit of the fastener strip downwardly from thermoplastic extruder means through a short transit distance to said bonding zone located below said extruder means, so that in such short transit distance said fastener strip as a whole would tend to retain substantial residual thermoplastic fusion temperature;

in said free running short transit distance, and before the fastener strip reaches said bonding zone, selectively chilling and thereby solidifying and stabilizing said fastener profile portion of the transitting fastener strip, and thereby preventing deformation of said profile but leaving said base portion at sufficient residual fusion temperature to remain thermoplastic to said bonding zone;

at the downstream end of said short transit distance and beyond said chilling step effecting assembly of the still thermoplastic base portion of the otherwise solidified strip with said substrate in said bonding zone, and in said bonding zone pressing the assembled downwardly running strip and substrate together and thereby effecting fusion bonding of said thermoplastic base portion to said substrate;

and downstream from said bonding zone setting and curing the bonded assembly.

2. A method according to claim 1, comprising effecting said assembly and pressing together of said strip and said substrate by engaging the same in a downwardly running nip between corunning and cooperating bonding and pinch rolls.

3. A method according to claim 1, which comprises applying auxiliary fusion promoting heat to a narrowly locally limited longitudinal area of said substrate aligned with said fastener strip.

4. A method according to claim 3, which comprises applying said auxiliary fusion promoting heat by running an annular rotary heating surface in contact with said limited longitudinal area of said substrate in advance of said effecting assembly of said strip and said substrate.

5. A method according to claim 3, which comprises applying said auxiliary fusion promoting heat by running an annular rotary heating surface in contact with said limited longitudinal area of said substrate in advance of said effecting assembly of said strip and said substrate and continuing to the point of fusion bonding of said base portion to said substrate.

6. A method according to claim 1, wherein said setting and curing of the bonded assembly comprises running the assembly along a longitudinally downwardly extending heat sink cooling plate, and applying a chilling fluid toward said plate and against said fastener strip bonded to said substrate.

7. A method according to claim 6, which comprises applying both chilling air and water spray toward said plate.

8. A method according to claim 6, comprising applying a water spray as the chilling fluid.

9. A method according to claim 6, which comprises leading the assembly from said plate and over a series of curing rolls.

10. A method according to claim 1, which comprises effecting continuous direct downwardly transit of respectively a male profile fastener strip and a complementary female profile fastener strip from the thermoplastic extruder means through said short transit distance to said bonding zone, in said short transit distance and upstream from said bonding zone chilling and solidifying and stabilizing the fastener profile portions of both of said strips and leaving the base portions of both strips in fused condition, effecting assembly of both of said strips to said substrate in spaced parallel relation in said bonding zone, and effecting fusion bonding of said fused base portions of said strips to said substrate.

11. A method according to claim 10, which comprises after setting and curing of the bonded assembly, folding the assembly between the bonded fastener strips and separably joining the profiles of the fastener strips.

12. A method according to claim 1, comprising applying an annular rotary heating surface to a narrow locally limited longitudinal area of said substrate and thereby stretching and supplying said longitudinal area with fusion promoting heat in said bonding zone, aligning said fastener strip in assembly with the thus heated and stretched longitudinal substrate area in said bonding zone, and engaging and bonding said base portion to said heated longitudinal substrate area.

13. A method according to claim 1, which comprises effecting said chilling by directing a low velocity stream of chilling fluid limited to said profile portion.

14. Apparatus for fusion bonding a continuous freshly extruded low melt viscosity synthetic thermoplastic resin fastener strip having a fastener profile portion and a base portion opposite the profile, to a continuously running prefabricated film substrate, which comprises:

- means for advancing the prefabricated substrate continuously through a bonding zone in which the substrate is directed to run downwardly;
- means for thermoplastically extruding the fastener strip for continuous free running direct transit through a short distance downwardly to said bonding zone, so that in such short transit distance, said fastener as a whole would tend to retain substantial residual thermoplastic fusion temperature;
- means located in said free running short transit distance, and before the fastener strip reaches said bonding zone, for selectively chilling and thereby solidifying and stabilizing said fastener profile portion of the transitting fastener strip, for preventing deformation of said profile, but leaving said base portion of the transitting fastener strip at sufficient residual fusion temperature to remain thermoplastic to said bonding zone;
- means located at the downstream end of said short transit distance and beyond said chilling means for effecting assembly of the still plastic base portion of the otherwise solidified strip with said substrate in said bonding zone, and for in said bonding zone pressing the assembled downwardly running strip and substrate together and thereby effecting fusion bonding of said thermoplastic base portion to said substrate;
- and means downstream from said bonding zone for setting and curing the bonded assembly.

15. Apparatus according to claim 14, wherein said means for effecting assembly and fusion bonding comprise corunning and cooperating bonding and pinch rolls.

16. Apparatus according to claim 14, including means for applying auxiliary fusion promoting heat to a narrowly locally limited longitudinal area of said substrate aligned with said fastener strip.

17. Apparatus according to claim 16, wherein said means for applying said auxiliary fusion promoting heat comprises an annular rotary heating surface in contact with said limited longitudinal area of said substrate.

18. Apparatus according to claim 16, wherein said means for applying said auxiliary fusion promoting heat ccmprises an annular rotary heating surface in contact with said limited longitudinal area of said substrate and forms a part of said means for effecting assembly and bonding of said strip and said substrate.

19. Apparatus according to claim 14, wherein said means for setting and curing of the bonded assembly comprises a longitudinally extending heat sink cooling plate, and means for applying a chilling fluid toward said plate and against said fastener strip bonded to said substrate.

20. Apparatus according to claim 19, wherein said means for applying chilling fluid directs both chilling air and water spray toward said plate.

21. Apparatus according to claim 19, wherein said means for applying chilling fluid applies a water spray as the chilling fluid.

22. Apparatus according to claim 19, which comprises means for leading the assembly from said plate and over a series of curing zone rolls.

23. Apparatus according to claim 14, wherein said extruding means is adapted for extruding and effecting continuous direct downward transit of respectively a male profile fastener strip and a complementary female profile fastener strip through said short transit distance to said bonding zone, said means located in said free running short transit distance and before said bonding zone for chilling being adapted for solidifying and stabilizing the fastener profile portions of both of said strips but leaving the base portions of both strips in fused condition, and said means for effecting assembly being adapted for assembling both of said strips to said substrate in spaced parallel relation in said bonding zone and for effecting fusion bonding of said fused base portions of said strips to said substrate.

24. Apparatus according to claim 23, comprising means for folding the assembly between the bonded fastener strips and for separably joining the profiles of the fastener strips after said assembly leaves said means for setting and curing.

25. Apparatus according to claim 14, comprising an annular rotary heating surface adapted to be applied to a narrow locally limited longitudinal area of said substrate for stretching and supplying said longitudinal area with fusion promoting heat in said bonding zone, and means for aligning said fastener strip in assembly with the thus heated and stretched longitudinal substrate area in said bonding zone and for engaging and bonding said base portion to said heated longitudinal substrate area.

26. Apparatus according to claim 14, wherein said means for chilling comprises a nozzle structure for directing a low velocity stream of chilling fluid limited to said profile portion.

27. A method of fusion bonding a fastener strip having a fastener profile and a base portion opposite the profile, to a continuous sheet of film substrate, which comprises:

advancing said substrate continuously through a bonding zone;

applying an annular rotary heating surface to a narrowly locally limited longitudinal area of said substrate and thereby supplying said longitudinal area with fusion promoting heat in said bonding zone;

aligning said fastener strip in assembly with the thus heated longitudinal substrate area in said bonding zone, and engaging and bonding said base portion to said heated longitudinal substrate area;

and setting and curing the bonded assembly.

28. A method according to claim 27, which comprises effecting stretching of said limited longitudinal area by the application of said annular rotary heating surface.

29. A method according to claim 27, comprising effecting continuous direct transit of the fastener strip from thermoplastic extruder means through a short distance to said bonding zone, so that in such short transit distance said fastener strip will retain substantial residual thermoplastic fusion temperature; chilling and thereby solidifying and stabilizing said fastener profile portion of the transitting fastener strip, but leaving said base portion at sufficient residual fusion temperature to remain thermoplastic to said bonding zone; and effecting said bonding by the combined thermoplasticity of said base portion and the fusion promoting heated condition of said longitudinal area.

30. Apparatus for fusion bonding a fastener strip having a fastener profile and a base portion opposite the profile, to a continuous sheet of film substrate, ccmprising:

means for advancing said substrate continuously through a bonding zone;

rotary bonding roll means having an annular heating surface for application to a narrow locally limited longitudinal area of said substrate for thereby supplying said longitudinal area with fusion promoting heat in said bonding zone;

means for aligning said fastener strip in assembly with the heated longitudinal substrate area in said bonding zone and for engaging and bonding said base portion to said heated longitudinal substrate area;

and means for chilling the bonded assembly.

31. Apparatus according to claim 30, wherein said annular heating surface is adapted for stretching said limited longitudinal area relative to the remainder of said substrate.

32. Apparatus according to claim 30, including thermoplastic extruder means for effecting continuous direct transit therefrom of the thermoplastic fastener strip through a short distance to said bonding zone, so that in such short transit distance said fastener strip will retain substantial residual thermoplastic fusion temperature; and means for chilling and thereby solidifying and stabilizing said fastener profile portion of the transitting fastener strip, but leaving said base portion at sufficient residual fusion temperature to remain thermoplastic to said bonding zone for bonding to said substrate by the combined thermoplasticity of said base portion and the fusion promoting heated condition of said longitudinal area.

* * * * *